United States Patent [19]
Taylor

[11] 3,876,397
[45] Apr. 8, 1975

[54] ADSORBING APPARATUS
[76] Inventor: John C. Taylor, 16 Cinnamon Ln., Portuguese Bend, Calif. 90274
[22] Filed: Jan. 2, 1973
[21] Appl. No.: 320,208

[52] U.S. Cl. ............................ 55/163; 55/88
[51] Int. Cl. .................................. B01d 53/04
[58] Field of Search ............ 55/21, 58, 88, 163, 179

[56] References Cited
UNITED STATES PATENTS

| | | | |
|---|---|---|---|
| 3,217,465 | 11/1965 | Fontaine et al. | 55/163 |
| 3,448,561 | 6/1969 | Seibert et al. | 55/163 |
| 3,519,398 | 7/1970 | Roberts | 55/163 |
| 3,540,188 | 11/1970 | Barrere et al. | 55/163 |
| 3,552,096 | 1/1971 | Dayson | 55/163 |

Primary Examiner—Charles N. Hart
Attorney, Agent, or Firm—Fulwider, Patton, Rieber, Lee & Utecht

[57] ABSTRACT

A self-stripping, recycling adsorbing unit for recovery of hydrocarbons from a mixture of hydrocarbon vapors and air, including two adsorbers filled with adsorbent material, automatically controlled valves which route the mixed vapor flow through one adsorber and connect the other to a stripping apparatus, and instrumentation which automatically determines when the flows through the adsorbers should be interchanged and which activates the automatic valves to accomplish this interchange. The stripping apparatus includes a compressor with suction arranged to alternately evacuate the adsorbers and with its discharge connected to a condenser. Condensed hydrocarbon is sent to storage and uncondensed vapors are recycled through the active adsorber together with mixed air and hydrocarbon vapors entering the system for processing.

An alternative means of stripping the adsorbers utilizes the compressor, condenser and related equipment from an existing vapor recovery system to which the adsorbers may be connected for stripping. Modifications to the existing system include instrumentation to provide for and restrict the use of existing components for stripping the adsorbers to time intervals when such components are otherwise inactive.

4 Claims, 3 Drawing Figures

PATENTED APR 8 1975 3,876,397

3,876,397

ADSORBING APPARATUS

BACKGROUND OF THE INVENTION

1. Field of the Invention

The adsorbing apparatus of present invention relates to an apparatus for recovering hydrocarbons from vapors collected during the operation of vehicle fueling facilities, such as automobile service stations, boat fuel depots, etc.

2. Description of the Prior Art

Anti-pollution legislation, present and pending, requires the prevention of hydrocarbon emissions from automobile fuel tanks and service station tanks during fueling operations. Several methods have been proposed for preventing such emissions, but such proposals are undesirable from the consideration of high cost of poor performance.

SUMMARY OF THE INVENTION

One method of recovering hydrocarbons from vapors is to pass the vapors through an adsorbent material, such as activated charcoal, which will let air pass through but which will condense and collect on its surface. Practically all of the hydrocarbons remaining would then be the problem of collection and disposal of the hydrocarbons from the saturated adsorbent, or the alternate replacement of the saturated adsorbent with unsaturated material.

The adsorber apparatus of present invention includes two adsorbers filled with activated charcoal or other suitable adsorbent material. Vapors collected from fueling operations are passed through one active adsorber wherein the hydrocarbons are adsorbed and the air is passed through to the atmosphere. Concurrently, an inactive adsorber is evacuated by a vacuum pump or compressor, the evacuated vapors being compressed, chilled and condensed. Condensed hydrocarbon is then removed from the condenser by a float operated valve and is returned to a storage tank. Uncondensed vapors leaving the condenser are separated from the condensate and are routed to join the inlet stream of collected vapors and are recycled through the active adsorber. This technique permits a lesser percentage of recovery in the condenser than would otherwise be required to provide the necessary overall recovery, thereby allowing for a lower operating pressure of the condenser, compressor and related equipment. A pressure controller senses reduced pressure in the evacuated adsorber and automatically controls valves which interchange the adsorber connections so that the vapors then flow through the newly evacuated adsorber and the other is connected to the compressor suction for evacuation. The apparatus thus provides a continuous adsorbing apparatus with automatic regeneration.

Another embodiment of this invention provides an adapter in combination with a service station vapor recovery apparatus, said adapter providing for the connection of an adsorbent filled container to said vapor recovery apparatus. When so connected, adsorbed hydrocarbons may be extracted from said container when the service station vapor recovery apparatus is otherwise inactive.

The objects and advantages of the present invention will become apparent from a consideration of the following description when taken in conjunction with the accompanying drawings.

DESCRIPTION OF THE PREFERRED EMBODIMENT

Figures 1, 2, 3:
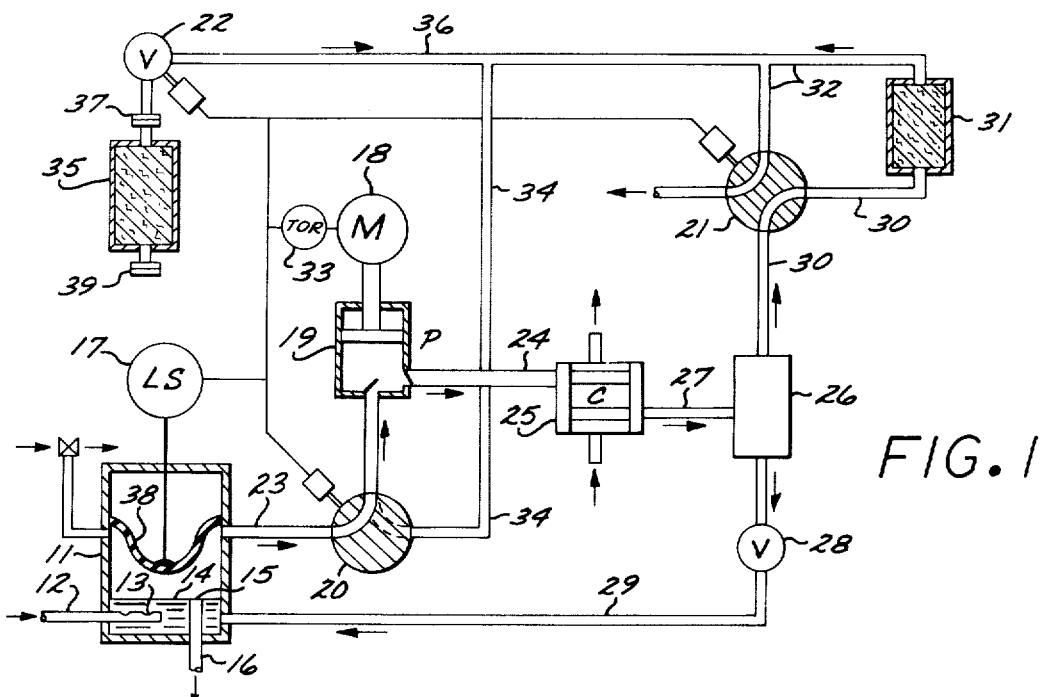
FIG. 1 is a diagrammatic view of a first embodiment of a service station vapor recovery unit constructed according to the present invention.
FIG. 2 is a diagrammatic view of yet another embodiment of a vapor recovery unit constructed according to the present invention.
FIG. 3 is a diagrammatical sectional view of the lower portion of the vapor surge tank shown in FIG. 1 showing the inlet and outlet thereof submerged in recovered hydrocarbon liquid, which is an embodiment of this invention.

Referring to FIG. 1, a first embodiment shows vapors collected from vehicle fueling operations by apparatus (not shown) enter a variable volume surge tank 11 via an inlet conduit 12 having outlet ports 13 disposed in the surge tank at a level below the surface of liquid hydrocarbon 14. The level of hydrocarbon 14 is maintained at a constant level by overflow weir 15 forming liquid outlet 16 of surge tank 11, said outlet being connected to a liquid hydrocarbon storage (not shown).

A switch 17 senses the volume of vapors in surge tank 11 by means of its connection to a flexible diaphragm 38 therein closing a circuit at a predetermined level of expansion to start a motor 18 of a conventional compressor 19. Switch 17 simultaneously energizes or deenergizes the solenoid operated valves 20, 21 and 22 to a position where the vapor flows from surge tank 11 via a conduit 23 across one solenoid operated valve 20 to compressor 19. Compressed vapors are discharged from compressor 19 via a conduit 24, entering a condenser 25 wherein the hydrocarbons are substantially condensed. Liquid condensate and uncondensed vapors flow from the condenser to a conventional vapor-liquid separator 26 via a conduit 27. A float operated liquid drain valve 28 permits a return of the liquid condensate via a conduit 29 from separator 26 to surge tank 11. Vapors leave vapor-liquid separator 26 via a conduit 30 across a four-way solenoid operated valve 21 switched to connect to an adsorber 31, which contains activated charcoal or other suitable adsorbent material permitting the passage of air but adsorbing hydrocarbons. Vapor leaving the adsorber 31 is routed through a conduit 32 across the four-way valve 21 which provides in this position a passage for venting thereof to the atmosphere. The solenoid operated valve 22 is closed during the foregoing operation.

When the operation of compressor 19 has reduced the gas volume in surge tank 11 to a predetermined low level, switch 17 reverses the position of the solenoid operated valve 20, 21 and 22 and activates a conventional time delay relay 33 in the control circuit of motor 18. Time delay relay 33 is set to keep the motor 18 and the compressor 19 running for a predetermined period of time after its activation during which, because of the reversal of the solenoid operated valves, the compressor 18 suction is connected to provide for evacuating the adsorber 31 via conduits 32 and 34. The compressor 19 may concurrently evacuate a second adsorber 35 connected to a conduit 36 by a connector 37, said conduit 36 containing the solenoid operated valve 22 which is now in the open position. During the evacuation operation, the inlet of the adsorber 35 is closed by a blind flange 39, or any other suitable device. Vapors discharged from the compressor during the evacuation operation are processed as before, except that the position of the solenoid operated valve 21 having been reversed, vapors leaving the separator 26 are vented directly to the atmosphere. It should be noted that these vented vapors contain only small amounts of hydrocarbon, and that the adsorber 31 serves to remove these small amounts of hydrocarbon when vapors pass therethrough.

Referring to FIG. 2, yet another embodiment includes a first adsorber 51 and second adsorber 52 which are again filled with activated charcoal, or any other suitable adsorbent material which will let air pass through but which will adsorb substantially all hydrocarbons from vapors passing therethrough. Vapors collected from vehicle fueling operations (by apparatus not shown) enter the first adsorber 51 via a conduit 53 containing a three-way solenoid operated valve 54 positioned to pass the vapors to the first adsorber wherein the hydrocarbons are substantially all adsorbed. Air which contains only very small amounts of hydrocarbons leaves the adsorber 51 via a vent conduit 55 across a three-way solenoid operated valve 56 to be vented to the atmosphere.

Concurrently with the above described operation, the said three-way solenoid operated valve 54 keeps the inlet to the second adsorber 52 closed so that the adsorber 52 can be evacuated by the compressor 58, the suction of which is connected to the said adsorber 52 by a conduit 59. The compressor 58 is driven by a motor 60, which may be started and stopped at predetermined times by a conventional clock timer 61. Vapors extracted from the second adsorber 52 are discharged, at a higher pressure, via a conduit 62 to a condenser 63 wherein the hydrocarbons are condensed. Condensate and uncondensed vapors flow via a conduit 64 to a separator tank 65. Liquid condensate leaves separator tank 65 via a conduit 66 containing a float valve 67, which permits only liquid to pass therethrough, to return the recovered hydrocarbon to a storage (not shown). Uncondensed vapors leave the separator 65 via a conduit 68 containing a pressure regulating valve 69 which is set to throttle the vapor discharge therethrough to maintain a predetermined pressure in the separator 65 and the vapor condenser 63, said higher pressure and the lower temperature in the condenser 63 effecting the condensation of hydrocarbons necessary for the recovery thereof. Vapors flowing through conduit 68 join with the collected vapors entering the active adsorber 51 via conduit 53 and are thus recycled through said first adsorber 51.

Conduit 74 contains a safety relief valve 73 which is set to protect that portion of the system which may become enclosed between the three-way solenoid operated valve 54 and compressor 58 from being overpressured. Conduit 77 contains a safety relief valve 76 which is set to protect that portion of the system which may become enclosed between compressor 58, float valve 67 and pressure regulating valve 69 from being overpressured. Any discharge across either of said safety relief valves 73 or 76 joins the vapors which are recycled through the active adsorber 51.

When the evacuation of the second or inactive adsorber 52 lowers the pressure therein to a predetermined value, a pressure sensitive switch 72, which is connected thereto by a pressure conduit 70 containing a three-way solenoid operated valve 71, energizes or de-energizes the solenoid operated valves 54, 56 and 71 reversing their positions to functionally interchange the adsorbers 51 and 52 so that adsorber 52 becomes the active adsorber and adsorber 51 is the inactive adsorber being regenerated. This reversal also connects the pressure sensitive switch 72 to adsorber 51 so that, when the pressure therein falls activating pressure of said pressure sensitive switch 72, the reversal will again occur. This reversal also switches any flow across safety relief valve 73 or safety relief valve 76. This automatically controlled reversal provides a continuously operating adsorber which is concurrently being continuously regenerated.

Referring to FIG. 3, collected vapors enter a surge tank 100 via a conduit 101 which has outlet ports 102 submerged below liquid level 103. Recovered liquid hydrocarbon, which may contain water condensate, enters surge tank 100 via recovered liquid inlet 104. The submergence of outlet 105 below the liquid in surge tank 100 provides for adsorption of any vapors issuing therefrom in said liquid. Recovered liquid hydrocarbon, which may contain some water, leaves surge tank 100 via a conduit 106 to storage (not shown). The inlet 107 to said conduit 106 is located close to the bottom 108 of surge tank 100 to provide for removal of water which, being more dense than the recovered hydrocarbons in surge tank 100, will collect at the bottom thereof. The weir 109 near the inlet of conduit 106 maintains a level of recovered liquid hydrocarbon in surge tank 100.

In operation the hydrocarbon vapors associated with any fueling operation are connected to a compressor 19 or 58 where they are compressed, thereby raising their temperature. The output of the compressor is fed to a conventional condenser which drops the temperature of the pressurized vapors, thereby effecting the condensation thereof. The products of condensation of the condenser are then fed to a conventional separator which, upon registering a predetermined volume of liquid, is drained, while connecting the separated vapor to an adsorber. The output of the adsorber is selectively switched, either to vent to atmosphere or to recirculate through the compressor and condenser. In a first embodiment of this invention the adsorber is recirculated during the times when no vapor evacuation takes place, thereby being regenerated during the times when the system is not in use. In a second embodiment two adsorbers are alternately connected to the compressor whereby one is connected to adsorb the output of the separator in combination with the input gases while the second one is being regenerated.

Some of the many advantages of the present invention should now be readily apparent. The invention provides means by which an adsorber is alternatively stripped and regenerated in combination with apparatus for separating out condensate. Thus continuous use of the system is assured, there being a regenerated adsorber constantly available for use. Recycling the uncondensed vapors from the stripping and regeneration process through the adsorber receiving the input vapors prevents emission to the atmosphere of vapors associated with such stripping operations. Thus a highly efficient means for recovery of hydrocarbons from a mixture of hydrocarbon vapors and air is assured.

I claim:

1. Apparatus for removing vapors from a mixture of vapor and air, comprising:

gas-receiving means for conducting said mixture;

a compressor having a low pressure inlet port and a high pressure outlet port;

a condenser connected to the outlet port of said compressor for separating the liquid and gas constituents passed by said compressor;

adsorption means connected to receive said gas constituents from said condenser for adsorbing said vapors from said gas constituents;

switching means connected to said adsorption means and said compressor for selectively connecting the output of said adsorption means to the input port of said compressor and closing concurrently the input of said adsorption means and the output of said receiving means; and said gas-receiving means includes a surge tank, an elastic membrane closing the top of the surge tank, gas orifice means connected to receive said gas and attached to void into said surge tank proximate the bottom thereof, means for supplying a part of said liquid constituent to said surge tank and means for maintaining the liquid level therein at a level about said orifice means.

2. Apparatus according to claim 1 wherein:

said switching means includes an electrical switch connected to said elastic membrane for switching to a first position when said membrane is extended and to a second position when said membrane is collapsed, said first position being connected to directly power said compressor, first valve means connected to said switch for conducting the output of said surge tank to the input of said compressor when said switch is in said first position and for connecting the output of said adsorption means to the input of said compressor and concurrently closing the output of said surge tank when said switch is in said second position, second valve means connected to said electrical switch for connecting the output of said adsorption means to said first valve means when said switch is in said second position and for venting said adsorption means when said switch is in said first position.

3. Apparatus according to claim 2 wherein:

said absorption means includes activated charcoal.

4. Apparatus according to claim 1 wherein:

said gas-receiving means includes separator means in the bottom thereof for separating water from hydrocarbons.

* * * * *